United States Patent
Cui et al.

(10) Patent No.: US 10,573,024 B1
(45) Date of Patent: Feb. 25, 2020

(54) DISTANCE DETECTION BASED ON CHROMATIC ABERRATION

(71) Applicant: Amazon Technologies, Inc., Seattle, WA (US)

(72) Inventors: Chengwu Cui, Redmond, WA (US); Scott Michael Wilcox, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 527 days.

(21) Appl. No.: 15/243,768

(22) Filed: Aug. 22, 2016

(51) Int. Cl.

| | |
|---|---|
| *G05D 1/04* | (2006.01) |
| *G06T 7/73* | (2017.01) |
| *H04N 9/07* | (2006.01) |
| *H04N 5/33* | (2006.01) |
| *G06T 7/90* | (2017.01) |
| *B64C 39/02* | (2006.01) |
| *B64D 47/08* | (2006.01) |
| *G08G 5/04* | (2006.01) |

(52) U.S. Cl.
CPC .............. *G06T 7/74* (2017.01); *B64C 39/024* (2013.01); *B64D 47/08* (2013.01); *G05D 1/042* (2013.01); *G06T 7/90* (2017.01); *G08G 5/04* (2013.01); *H04N 5/332* (2013.01); *H04N 9/07* (2013.01); *B64C 2201/127* (2013.01); *G06T 2207/10024* (2013.01); *G06T 2207/10036* (2013.01)

(58) Field of Classification Search
CPC ... G06T 7/74; G06T 7/90; G06T 2207/10024; G06T 2207/10036; B64C 39/024; B64C 2201/127; B64D 47/08; G05D 1/042; G08G 5/04; H04N 5/332; H04N 9/07

USPC ........................................................ 348/117
See application file for complete search history.

(56) References Cited

U.S. PATENT DOCUMENTS

| | | | | |
|---|---|---|---|---|
| 5,966,161 A | * | 10/1999 | Kato | G02B 26/125 347/258 |
| 6,868,190 B1 | * | 3/2005 | Morton | G06T 5/00 348/208.13 |
| 8,723,912 B2 | * | 5/2014 | Michrowski | H04N 7/147 348/14.01 |
| 9,618,940 B1 | * | 4/2017 | Michini | H04N 7/183 |
| 2004/0118927 A1 | * | 6/2004 | Breytman | G06K 7/0004 235/462.37 |
| 2004/0120047 A1 | * | 6/2004 | Harwit | G02B 3/0056 359/619 |
| 2009/0037877 A1 | * | 2/2009 | Liege | G06F 9/4484 717/114 |
| 2013/0043314 A1 | * | 2/2013 | Gillet | G06K 7/12 235/462.25 |

(Continued)

*Primary Examiner* — Matthew K Kwan
(74) *Attorney, Agent, or Firm* — Kilpatrick Townsend & Stockton LLP

(57) ABSTRACT

Described herein are systems and methods of determining a distance between an object depicted in an image and an imaging device that captured that image. In particular, the disclosure discusses that an image may be separated into multiple derivative images, each of which is associated with a different wavelength of light. In some embodiments, an image may be separated into images associated with wavelengths of primary colors (e.g., red, green, and blue). Once separate images have been created, a sharpness value may be determined for each image. A distance between the object and the imaging device may then be calculated based on sharpness values associated with each of the separate images.

20 Claims, 8 Drawing Sheets

(56) References Cited

U.S. PATENT DOCUMENTS

2013/0046137 A1\* 2/2013 Zhao ................. A61B 1/00181
600/102
2015/0016666 A1\* 1/2015 Payne, Jr. ................. G06T 7/73
382/103

\* cited by examiner

DISTANCE DETECTION BASED ON CHROMATIC ABERRATION

BACKGROUND

As businesses seek to reduce costs, they are increasingly relying on automated systems. This has led to an increased reliance on automated delivery services, such as those provided by automated unmanned vehicles. With the growing reliance on unmanned vehicles, route guidance and collision avoidance systems are becoming increasingly important. However, these systems often require bulky and expensive equipment (e.g., radar systems, etc.). This may be problematic in unmanned vehicles which have weight/mass limitation requirements, such as unmanned aerial vehicles.

Embodiments of the invention address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
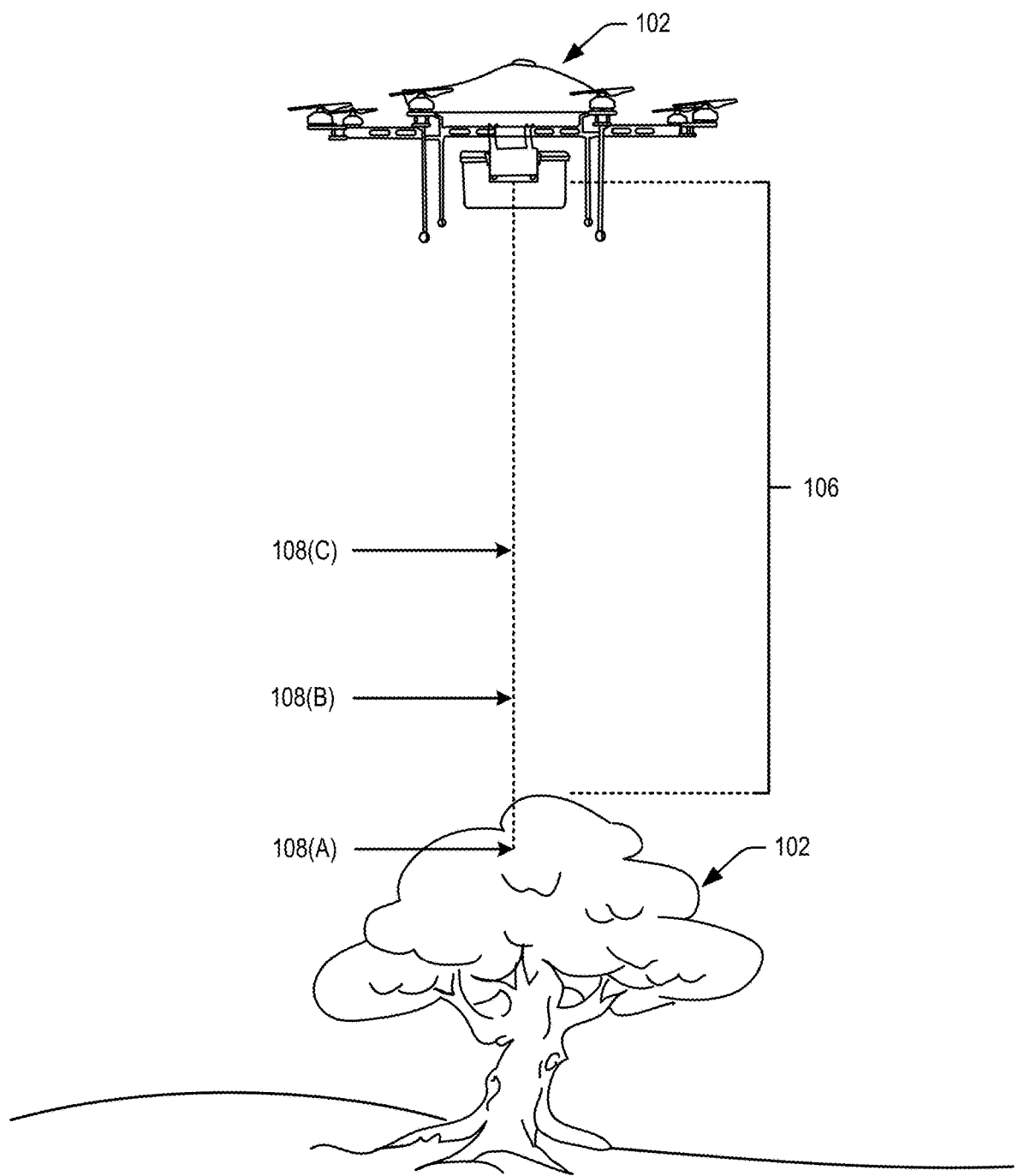
FIG. 1 depicts an example system in which device may be configured to determine a distance between itself and another object in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The disclosure is directed to systems and methods of determining a distance between an object depicted in an image and an imaging device that captured the image. In particular, the disclosure discusses that an image may be separated into multiple derivative images, each of which is associated with a different wavelength of light. For example, an image may be separated into images associated with primary colors (e.g., red, green, and blue). Because each of the separate images is associated with a different wavelength, and because each different wavelength has a different focal point with a given lens, the images will have a varying degree of sharpness. In some embodiments, multiple derivative images may be captured using a plurality of imaging devices (e.g., cameras). In some embodiments, the plurality of imaging devices may each be equipped with a lens having a different focal length (e.g., the lenses may have different curvature or may have a different refractive index). Once separate images have been created, the images may be compared to identify which is sharpest. A distance between the object and the imaging device may then be calculated based on sharpness values associated with each of the separate images.

In some embodiments, the system may be enhanced by capturing images associated with additional different wavelengths. For example, in addition to using images associated with wavelengths from a visible spectrum, the system may use images associated with wavelengths of infrared and/or ultraviolet. This can serve to spread the distance between focal points out, so that the system may more accurately identify the distance associated with an object.

Also discussed in the disclosure is the use of the system by an electronic device, such as an unmanned aerial vehicle (UAV), may navigate using the system. As described, a UAV may use the system to determine a distance between itself and an object on the ground. This is useful in automated traversal systems in which the UAV is required to maintain a specified altitude. Additionally, the UAV may include a collision avoidance system that uses embodiments of the disclosure.

It should be noted that several technical advantages are provided by embodiments of the disclosure. For example, the system enables distance to be calculated using commonly available materials (e.g., using only a camera device). In other words, this allows distance calculation to be performed without the addition of radar or other systems. These additional systems are often bulky and expensive. The elimination of bulky systems is especially important in UAVs, which often have weight limitation requirements. In another example, the system enables a UAV or other electronic device to generate a 3D map, in which a location and height of objects within its path may be processed and stored for future route guidance calculations.

FIG. 1 depicts an example system in which device may be configured to determine a distance between itself and another object in accordance with at least some embodiments. Depicted in the example is a device 102 (e.g., an unmanned aerial vehicle (UAV)) and an object 104 positioned some distance 106 from the device 102. In accordance with embodiments of the disclosure, the device 102 may include an optical sensor capable of collecting image information associated with the object 104.

In some embodiments, image information collected by the device 102 may be separated into (or collected as) multiple derivative images, each of which is associated with a different wavelength. In some embodiments, the optical sensor may use one or more color filtration techniques (e.g., a color wheel, a Bayer filter, or any other suitable means for separating color information) to form separate derivative images based on color. For example, the image of the object may be separated into three separate derivative images corresponding to primary colors, one of which includes an image of the object as formed by red light, one of which includes an image of the object as formed by green light, and one of which includes an image of the object as formed by blue light. In this example, because each wavelength will have a different focal point as depicted by 108 (A-C), each of the separate derivative images may display a different level of sharpness (i.e., the degree to which the image is in focus).

In some embodiments, image information collected by the device 102 may be captured using multiple imaging devices, each associated with different focal points. For example, two camera devices may be located proximate to each other and may each capture an image of the same object. In this example, each of the camera devices may include lenses of varying focal points 108 (A-C). By determining a sharpness value for each of the captured images, the device 102 may estimate a distance 106 from the object.

The multiple derivative images of the object 104 may then be processed using one or more machine vision techniques in order to determine the distance 106 of the object 104 from the device 102. To do this, each image of the multiple derivative images may be analyzed to determine which image is the sharpest (e.g., has the highest acutance value or lowest level of blur). The distance 106 from the object 104 to the device 102 may then be estimated based on the relative sharpness of each of the images in accordance with embodiments of the disclosure.

Distance information may be used by the device 102 in a number of ways. For example, the device may calculate, or alter, a route based on estimated distance information. In some embodiments, a device may be configured to maintain a certain threshold distance from particular objects. For example, a UAV may be configured to maintain a certain altitude while traversing to its destination. In this example, upon estimating the distance between itself and an object on the ground, the UAV may determine whether its altitude is sufficient and may adjust its altitude accordingly. In another example, a UAV may determine the distance between itself and a delivery location in order to calculate an amount of cable to be released in order to lower a payload to the delivery location. In yet another example, a UAV may determine the distance between itself and a landing zone in order to calculate a speed at which to descend while performing a landing.

Figure 2:
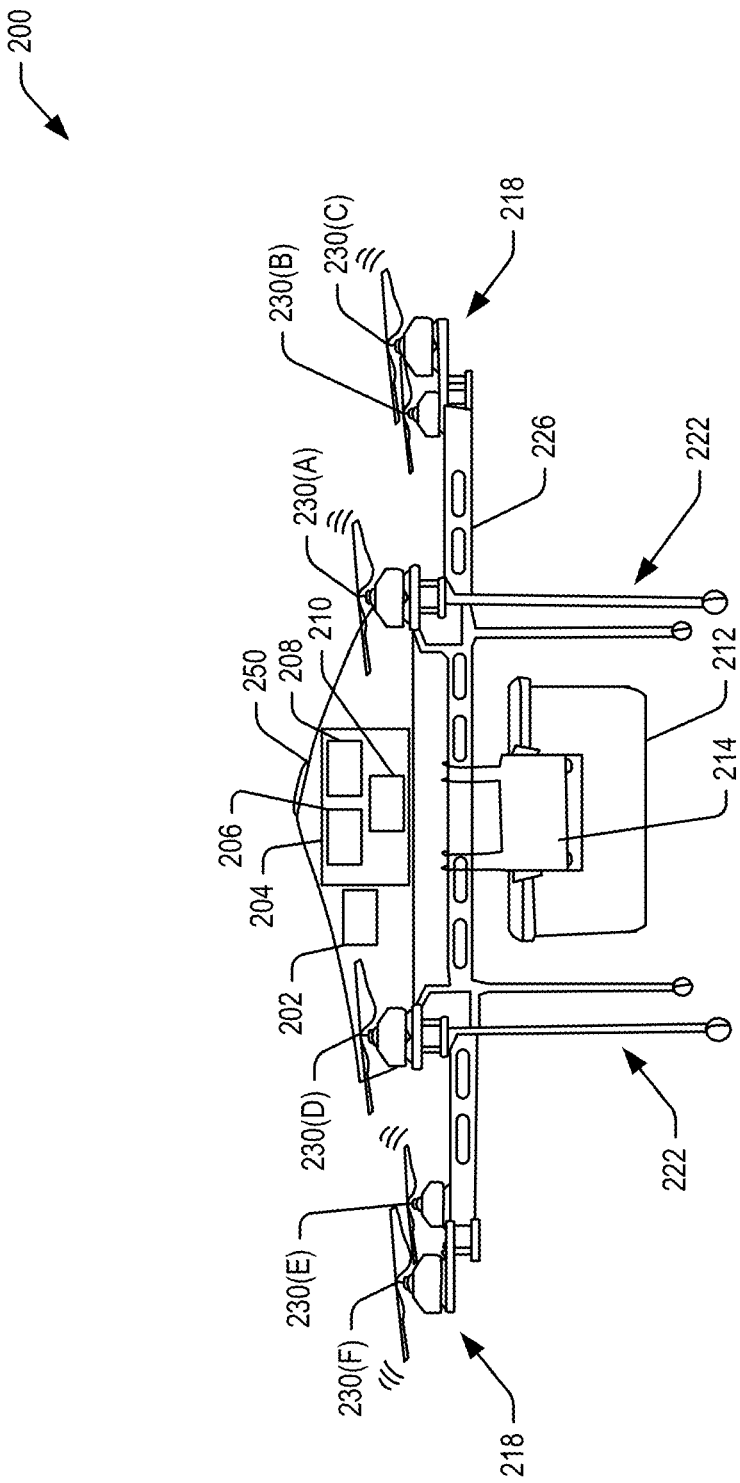
FIG. 2 illustrates an example unmanned aerial vehicle configured to deliver an item, according to embodiments.

FIG. 2 illustrates an example unmanned aerial vehicle configured to deliver an item, according to embodiments. In FIG. 2, an example UAV 200 configured to deliver an item is illustrated. The UAV 200 may be designed in accordance with commercial aviation standards and may include multiple redundancies to ensure reliability. In particular, the UAV 200 may include a plurality of systems or subsystems operating under the control of, or at least partly under the control of, a management component 202. The management component 202 may be configured to mechanically and/or electronically manage and/or control various operations of other components of the UAV 200. For example, the management component 202 may include various sensing, activating, and monitoring mechanisms to manage and control the various operations. For instance, the management component 202 may include or interface with an onboard computing system 204 hosting a management module for autonomously or semi-autonomously controlling and managing various operations of the UAV 200 and, in some examples, for enabling remote control by a pilot. The various operations may also include managing other components of the UAV 200, such as a propulsion system 218 to facilitate flights, a payload holding mechanism 212 to facilitate holding a payload (e.g., a package), and/or a payload releasing mechanism 214 to facilitate release and delivery of the payload. Portions of the management component 202, including mechanical and/or electronic control mechanisms may be housed under the top cover 250 or distributed within other components such as the payload holding mechanism 212 and the payload releasing mechanism 214. In a further example, components remote from the UAV 200 may be deployed and may be in communication with the management component 202 to direct some or all of the operations of the management component 202. These remote components may also be referred to as a management component. In an example, the management component 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), and radio-frequency identification (RFID) capability (not shown).

The UAV 200 may also include the onboard computing system 204. In an example, the computing system 204 may be integrated with the management component 202. In another example, the computing system 204 may be separate from but may interface with the management component 202. The computing system 204 may be configured to provide an electronic control of various operations of the UAV 200, including the ones provided by the management module. In an example, the computing system 204 may also process sensed data by one or more other components of the UAV, such as the management component 200, to generate data associated with a delivery surface. In a further example, the computing system 204 may also electronically control components of the payload holding mechanism 212 and/or the payload releasing mechanism 214. In another example, the computing system 204 may also electronically control components of the UAV 200 such as a plurality of propulsion devices, a few of which, 230(A)-230(F) are included in FIG. 2. The management component 202 and computing system 204 may be configured to alter the usage, modulation, and rotational speed of the propellers of the propulsion devices 230(A)-230(F) to reduce and/or increase the altitude of the UAV 200 as described herein. In embodiments, the propellers of the propulsion devices 230(A)-230(F) may be of various and different sizes from one another (such as varied length, width, or any other suitable dimensional combination to enable a difference between propeller sizes) and or comprise various propeller blade treatments.

As illustrated in FIG. 2, the computing system 204 may be housed within the top cover 250 and may include a number of components, such as a computer 206, a storage device 208, and an interface 210. The computer 206 may host the management module configured to provide management operations of the flight and/or other portions of a mission of the UAV 200. For example, the data management module may provide processing of images of an environment around the UAV 200, determine an appropriate altitude, direct the modulation of the different sets of propellers of different sizes, determine an appropriate delivery surface, determine a distance by which to lower a payload, a speed of lowering the payload, direct the propulsion system to position the UAV 200 according to this data, activate a release of a package from the payload holding mechanism 212, activate a release of a cable, and/or activate other functions of the mission, and continue to modulate the different sets of propellers of different sizes during various portions of the mission to deliver the payload. The storage device 208 may represent one or more storage media, such as a volatile or non-volatile semiconductor, magnetic, or optical storage media.

In accordance with at least some embodiments, the onboard computing system 204 may be communicatively coupled to one or more optical sensors (e.g., camera devices) included on the UAV. The one or more optical sensors may be configured to collect image information pertaining to the environment surrounding the UAV. For example, optical sensors may communicate image information to the onboard computing system 204 that includes imagery of one or more objects located below the UAV. The image information may then be processed by the onboard computing system 204 using one or more machine vision techniques. In some embodiments, the image information may be transmitted by the onboard computing system 204 to a remote server, which provides processing support for the UAV 200. In at least some of these embodiments, the remote server may process the image information using one or more machine vision techniques. Whether the image information is processed by the onboard computing system 204 or by a remote server, it may be analyzed to identify chromatic aberration within the image information. The altitude of the UAV 200 may then be determined in accordance with embodiments of this disclosure. In some embodiments, the altitude information may be used to adjust the altitude of the UAV 200. For example, the onboard computing system 204 may cause the speed of the propellers to increase or decrease. In another example, the onboard computing system 204 may alter the configuration of propellers that are currently active.

In an example, the storage device 208 may be configured to store any operational data of the UAV 200, image information obtained by sensors associated with the UAV 200 regarding objects around the UAV 200, generated or received data associated with the delivery surface, and/or received data associated with a delivery location. The data may include the distance by which the payload may be lowered and the lowering speed. In addition, the storage device 208 may store a set of rules associated with lowering and releasing the payload. This set of rules may specify parameters to determine, where, when, and/or how to deliver the payload such that a likelihood of damaging the payload (or content thereof) and/or interference with the UAV 200 may be reduced. The computer 206 (e.g., the management module) may monitor and/or determine some or all of the parameters and accordingly generate the distance and/or the speed for delivery and determine the appropriate sets of particular propellers of a certain size with corresponding rotational speed to utilize to reduce and/or increase an altitude associated with the UAV 200. In some embodiments, the computer 206 (e.g., the management module) may generate instructions for deploying particular propeller treatments for reducing and/or altering sound generated during flight of the UAV 200. The modulation of the different sets of propellers and/or deployment/retraction of propeller treatments may be electronically or mechanically controlled. The interface 210 may represent an interface for exchanging data as part of managing and/or controlling some of the operations of the UAV 210. In an example, the interface 210 may be configured to facilitate data exchanges with the management component 202, other components of the UAV 200, and/or other components remote from the UAV 200. As such, the interface 210 may include high speed interfaces, wired and/or wireless, serial and/or parallel, to enable fast upload and download of data to and from the computing system 204.

As shown in FIG. 2, the UAV 200 may also include the payload holding mechanism 212. The payload holding mechanism 212 may be configured to hold or retain a payload. In some examples, the payload holding mechanism 212 may hold or retain the payload using friction, vacuum suction, opposing arms, magnets, holding, and/or other retaining mechanisms. As illustrated in FIG. 2, the payload holding mechanism 212 may include a compartment configured to contain the payload. In another example, the payload holding mechanism 212 may include two opposing arms configured to apply friction to the payload. The management component 202 may be configured to control at least a portion of the payload holding mechanism 212. For example, the management component 202 may electronically and/or mechanically activate the payload holding mechanism 212 to hold and/or release the payload. In an example, the payload may be released from the payload holding mechanism 212 by opening the compartment, pushing the payload, moving one or both of the opposing arms, and/or stopping an application of friction, vacuum suction, and/or magnetic force.

The UAV 200 may also include the payload releasing mechanism 214. In an example, the payload releasing mechanism 214 may be integrated with the payload holding mechanism 212. In another example, the payload releasing mechanism may be separate from the payload holding mechanism 212. In both examples, the payload releasing mechanism 214 may be configured to lower, using a cable, a payload released from the payload holding mechanism 214 and to release the cable once the payload is lowered by a distance.

As such, the payload releasing mechanism 214 may include a lowering mechanism and a release mechanism. For example, the lowering mechanism may include a cable and/or an electronic or mechanical control configured to lower the cable at a controlled speed. For example, this control may include a winch, a spool, a ratchet, and/or a clamp. The cable may couple the payload with the UAV 200. For example, one end of the cable may be connected, attached, or integral to the payload. Another end of the cable may be coupled to one or more components of the payload releasing mechanism 214, the payload holding mechanism 212, the frame of the UAV 200, and/or other component(s) of the UAV 200. For example, the cable may be coiled around the winch or spool or may be stowed or coiled inside the compartment (if one is used as part of the payload holding mechanism 212). The cable may have a configuration selected based on the mission of the UAV 200, the mass of the payload, and/or an expected environment associated with the delivery location (e.g., the potential interference).

In an example, the release mechanism may be integrated with the lowering mechanism. In another example, the release mechanism may be separate from the lowering mechanism. In both examples, the release mechanism may be configured to release the cable when the payload may have been lowered by a certain distance. Releasing the cable may include severing the cable, weakening the cable, and/or decoupling the cable from the UAV 200 (e.g. from the payload releasing mechanism 214) without severing or weakening the cable.

To sever the cable, the release mechanism may include a sharp surface, such as a blade to, for example, cut the cable when applied thereto. To weaken the cable, the release mechanism may include a sharp head, edge, and/or point, such as a hole puncher, or a friction surface to cause a damage to the integrity of the structure of the cable. Other release mechanisms may also be used to sever or weaken the cable. An example may include a mechanism configured to apply a thermoelectric effect to the cable. For instance, a contact surface, such as one using an electrical conductor, may be configured to release heat upon application of a voltage. The contact surface may come in contact with the cable or may be integrated within different sections of the cable. Upon application of the voltage, the contact surface may sever or weaken the cable by applying heat to the cable. To decouple the cable from the UAV 200, the cable may be in the first place insecurely coupled to the UAV 200 such that, upon an unwinding of the cable, the cable may become detached from the UAV 200. For example, the cable may be coiled around the winch or spool without having any of the cable ends attached to the winch or spool or to another component of the UAV 200. In another example, the cable may be coupled to a component of the UAV 200 through a weak link such that upon a tension generated based on the mass of the payload, the link may be broken to free the cable from the UAV 200.

The release mechanism may be electronically or mechanically controlled. This control may be effected based on, for example, the distance by which the payload may have been lowered and/or based on an amount of a tension of the cable, an increase in the amount, a decrease in the amount, or a sudden or fast change in the amount. Various configurations may be used to measure the distance, the amount of tension, and the change in the amount. For example, the distance may be determined from the number of rotations of a winch or spool if one is used or based on a distance or cable length sensor. The amount of the tension and the change in the amount may be determined based on spring-based or electronic-based sensors.

Further, the release mechanism may be electronically activated based on a signal generated in response to detecting that the distance may have been travelled and/or the amount or change in the amount of tension. In another example, the release mechanism may be activated based on a mechanical configuration. For example, as the cable may be lowered, a ratchet may load a spring that may be coupled to release mechanism. Upon the load exceeding a threshold, the spring may be released, thereby activating the release mechanism. In another example, a tension of the cable may be used to hold the release mechanism away from the cable. As soon as the tension changes (e.g., the cable becomes loose indicating that the payload may be resting on the ground), the release mechanism may be activated to sever or weaken the cable.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management component 202. In some examples, the propulsion system 218 may be configured to adjust itself without receiving instructions from the management component 202. Thus, the propulsion system 218 may operate semi-autonomously or autonomously. In some embodiments, the propulsion system 218 may, in conjunction from instructions from the management module, dynamically modulate between the different sets of different size propellers to reduce and/or increase an altitude of the UAV 200.

The UAV 200 may also include landing structure 222. The landing structure 222 may be adequately rigid to support the UAV 200 and the payload. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and may be capable of supporting, via different connections, the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Hence, a UAV, similar to the UAV 200, may be deployed on a mission to, for example, deliver a payload, by modulating between and or utilizing various sets of propellers of different sizes. The UAV may autonomously or semi-autonomously complete or perform a portion of the mission. For example, coordinates of a delivery location may be provided to the UAV. The UAV may hold the payload in a payload holding mechanism and fly to the delivery location. During traversal to the location, the UAV may continue to calculate its altitude using image information received from its optical sensors. The UAV may adjust its altitude throughout the traversal to match a predetermined optimal altitude. Upon arrival to the location, the UAV may release the payload from the payload holding mechanism. The UAV may use various sets of propellers of different sizes to gain or decrease altitude while traversing to the delivery location and during the return trip to an origin location or facility from which it deployed.

For simplicity of illustration, a certain number of components are shown in FIG. 2. It is understood, however, that embodiments of the invention may include more than one of each component. In addition, some embodiments of the invention may include fewer than or greater than all of the components shown in FIG. 2. In addition, the components in FIG. 2 may communicate via any suitable communication medium, using any suitable communications protocol.

Figure 3A:
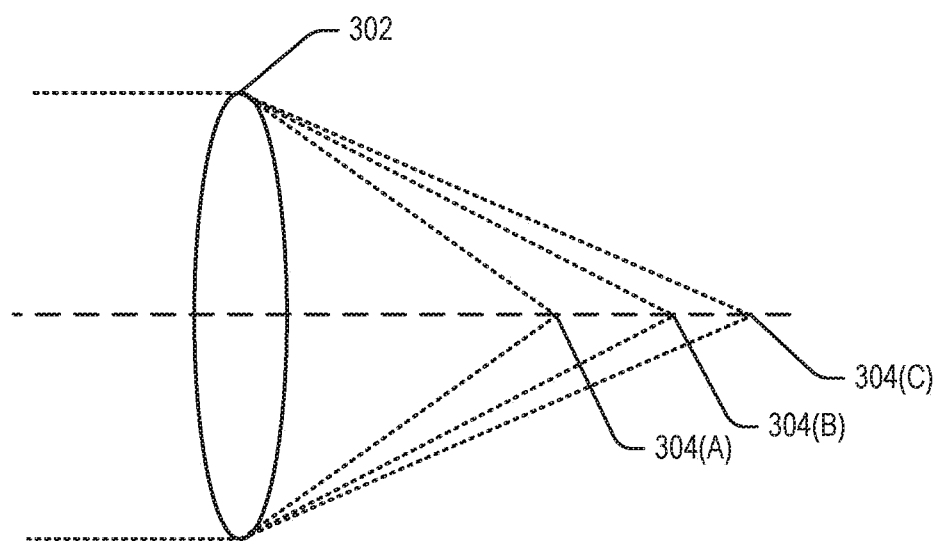
FIGS. 3A and 3B provide an illustrative explanation of chromatic aberration that may occur in images used to calculate a distance in accordance with at least some embodiments.
Figure 3B:
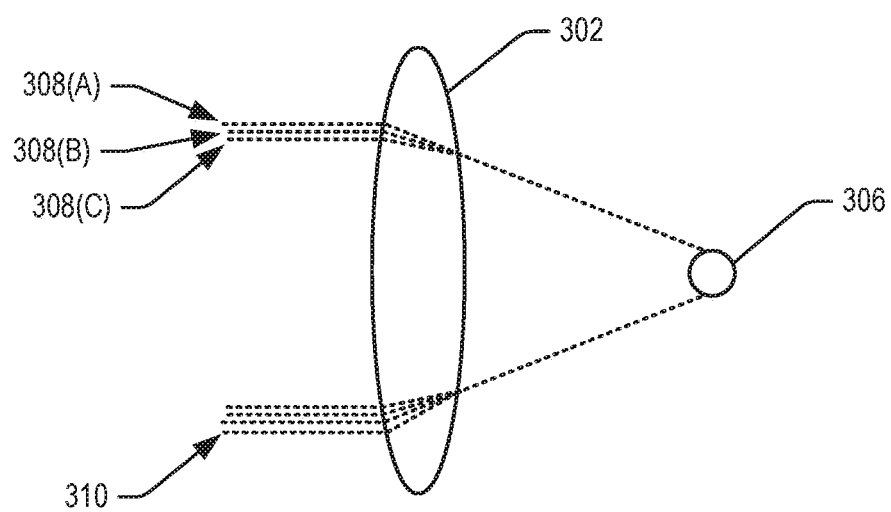

FIG. 3 provides an illustrative example of chromatic aberration that may occur in images used to calculate a distance in accordance with at least some embodiments. For the purposes of this disclosure, FIG. 3 has been broken into FIG. 3A and FIG. 3B. Chromatic aberration is an effect resulting from dispersion in which there is a failure of a lens to focus all colors to the same focal point.

FIG. 3A depicts a multitude of focal points associated with a multitude of light wavelengths for a lens. Lenses have different refractive indices for different wavelengths of light. Since the focal length f of a lens is dependent on the refractive index, different wavelengths of light will be focused on different positions. Accordingly, light affected by a lens 302 may be associated with a multitude of focal points 304 (A-C) based on its wavelength.

It should be noted that the use of the word "lens" is intended to encompass any suitable transparent substance that focuses or otherwise modifies the direction of movement of light. In some embodiments, the lens may comprise a number of lenses arranged in a series. For example, a lens may comprise multiple layers of different materials. Embodiments of the disclosure may use a lens that is designed to exaggerate a chromatic aberration effect. For example, the location of each focal point 304 (A-C) is dependent upon the refractive index and the curvature of the lens 302. In some embodiments, a lens may be created that exaggerates, or increases, the distance between focal points 304 (A-C). One skilled in the art may design a lens out of a material with a specific refractive index and/or with a specific curvature designed in which focal points 304 for specified wavelengths are located around a particular distance. The use of such a lens within the disclosed system could be used to enable one skilled in the art to detect objects at that particular distance. Embodiments of the disclosure may use a lens that is at least partially uncorrected for a chromatic aberration effect. For example, the lens may include none of, or fewer of, features designed to reduce the chromatic aberration effect.

FIG. 3B depicts blurring caused by chromatic aberration that may occur as a result of using a lens to view an object. Chromatic aberration can manifest itself as "fringes" of color along boundaries that separate dark and bright parts of the image, because each color in the optical spectrum cannot be focused at a single common point. There are two types of chromatic aberration: axial (longitudinal), and transverse (lateral). Axial aberration occurs when different wavelengths of light are focused at different distances from the lens, i.e., different points on the optical axis (focus shift). Transverse aberration occurs when different wavelengths are focused at different positions in the focal plane (because the magnification and/or distortion of the lens also varies with wavelength).

As illustrated, a lens 302 may be used to view, or capture image information associated with, an object 306. Image information may be captured using one or more optical sensor devices (e.g., camera devices). In some embodiments, an optical sensor may capture image information by separately collecting information pertaining to different wavelengths of light. For example, a typical digital camera may include a number of color filters that may each be used to capture information pertaining to a specific range of wavelength. In this example, the digital camera may then combine each of the collected image information into a single digital image. Because each wavelength of light is associated with a different focal point (as illustrated with respect to FIG. 3A), light associated with the edge of the object 306 will be separated according to wavelength, as depicted by 308 (A-C). This can create the "fringes" or blurring commonly associated with chromatic aberration. In the depicted illustration, the closer that the object 306 is to a focal point 304 for a particular wavelength, the less blur that will occur for that wavelength.

In some embodiments, it may be beneficial to exaggerate or increase the blur caused by chromatic aberration. This can result in increased accuracy of distance analysis. To do this, one skilled in the art may enhance the system by increasing the spectrum used. For example, by collecting images associated with an infrared wavelength 306, the system may analyze the distance to the object 306 a larger spread of focal points. The infrared wavelength 306 may also (in some cases) provide a greater degree of blur than systems which use only wavelengths of a visible spectrum. In some embodiments, an image of infrared and/or ultraviolet wavelengths may be used in order to increase accuracy of the system in accordance with at least some embodiments.

Figure 4:
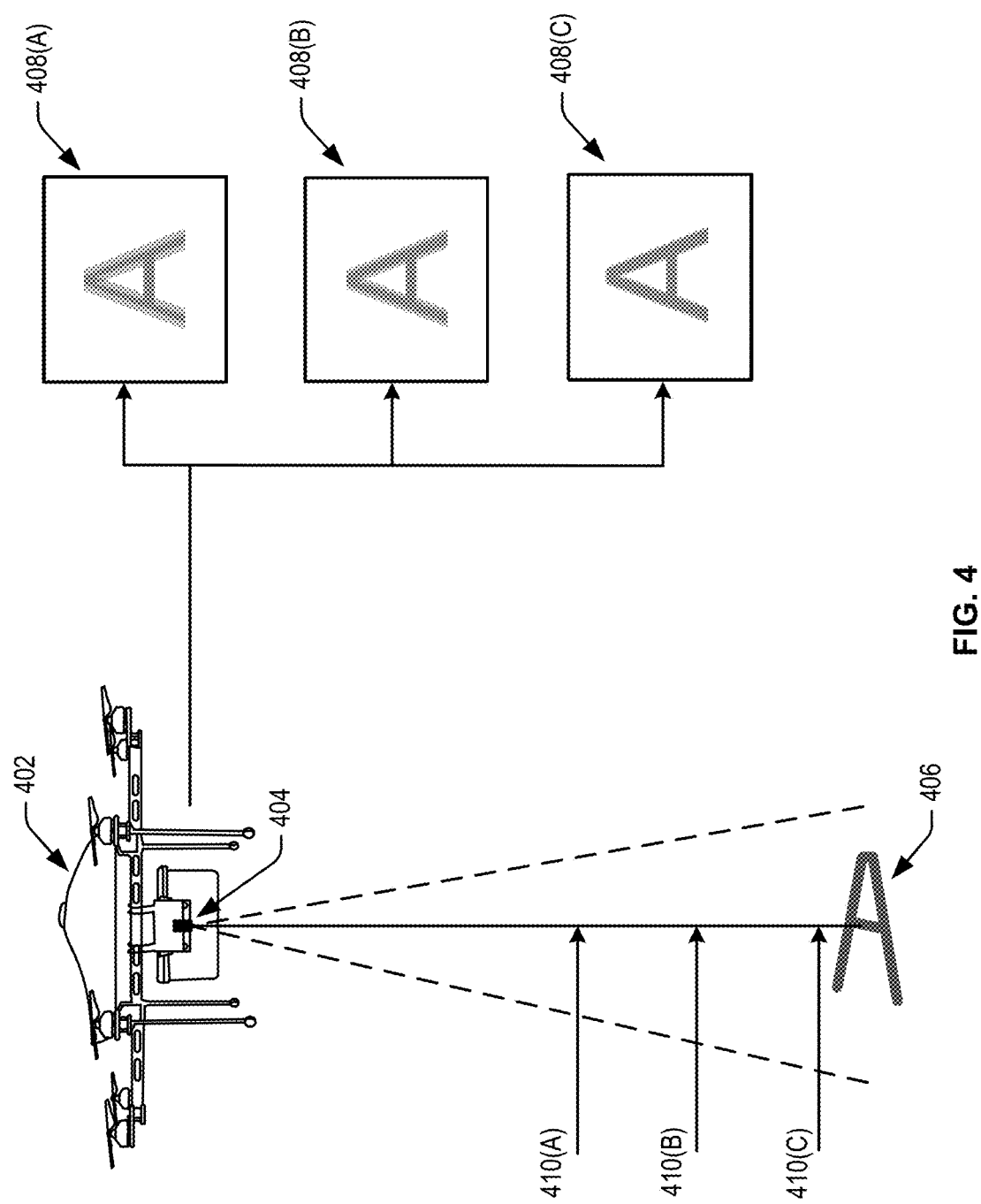
FIG. 4 illustrates an example approach for determining a distance to an object based on image information including an image of the object in accordance with embodiments of the disclosure.

FIG. 4 illustrates an example approach for determining a distance to an object based on image information including an image of the object in accordance with embodiments of the disclosure. In FIG. 4, a device 402 may include an imaging device 404 capable of collecting image information. Upon capturing image information that includes an image of an object 406, the device 402 may determine its distance from that object.

In accordance with at least some embodiments, the imaging device 404 may use one or more color filtration techniques (e.g., a color filter array or color filter mosaic) to separate captured image information into derivative images, each specific to a range of wavelengths. For example, the imaging device 404 may include a color filter array that comprises a pattern of tiny color filters, each of which is placed over a pixel sensor of the imaging device 404 and each of which allows only a specified wavelength or range of wavelengths (representing a color) through to the pixel sensor. By alternating the color filters, and hence the specified wavelength or wavelengths filtered to each pixel sensor, over a mosaic pattern, separate images may be formed correlating to each of the alternating ranges of wavelengths. An example of a color filter array that may be implemented in some embodiments is described in U.S. Pat. No. 3,971,065 to Bayer.

It should be noted that in some embodiments, an imaging device 404 may be configured to capture image information using the color filter array described above and may subsequently be configured to combine the separate image information into a single image using a demosaicing technique. In this scenario, the separate images collected by the imaging device 404 prior to the demosaicing process may be used in accordance with this disclosure.

The use of a color filter array may result in the collection of separate images 408 (A-C). Because each of the separate images 408 (A-C) corresponds to a different wavelength or range of wavelengths, each image will also correspond to a different focal point 410 (A-C). The closer that the object 406 is to the focal point associated with a particular separate image 408, the sharper that the object 406 will appear in that separate image 408. Accordingly, a distance to the object 406 may be calculated by comparing a relative sharpness of the object 406 as appearing in each of the separate images 408. Some example approaches for determining sharpness of an object 406 within an image 408 are described in greater detail with respect to FIG. 5 below.

In accordance with at least some embodiments, multiple imaging devices 404 may be used to capture the separate images 408. For example, multiple imaging devices 404 may be located proximate to each other, and may be used to capture image information pertaining to the same object. In some embodiments, each of the multiple imaging devices 404 may be equipped with a different lens, or a lens of a different focal point. In this scenario, each of the multiple images may not be associated with a different wavelength. For example, each of the separate images may comprise an image of the same wavelength as the other separate images, but at a different level of sharpness. It should be recognized that one skilled in the art would recognize that any processing associated with these embodiments is similar to the processing performed on other disclosed embodiments.

In some embodiments, the distance to the object 406 may be estimated based on quantitative sharpness values calculated for the object 406 in each image 408. For example, the distance between the imaging device 404 and each of the focal points 410 may be known or may be calculated based on the curvature of the lens used by the imaging device 404 and the refractive index of the material that the lens is made from. In some embodiments, a lens may be selected such that the distance to each of the focal points is known. In this example, a distance from the imaging device 404 to the object 406 may be calculated using the known focal distances and the sharpness value. In some embodiments, this may require comparing at least two separate distance measurements calculated from at least two of the images 408. For example, the image 408 of the object 406 may be blurred (decreased in sharpness) if the object 406 is located either closer to the imaging device 404 or farther away from the imaging device 404 than the respective focal point 410 of the image 408. Accordingly, the distance of the object 406 from the focal point 410 may be determined, but it may not be possible to determine whether the object 406 is closer to, or further away from the imaging device 404 than the focal point 410. In other words, we may be able to determine that $D_O = D_F \pm D_S$ (where $D_O$ is the distance to the object, $D_F$ is the distance to the focal point 410, and $D_S$ is the distance from the focal point 410 to the object 406 calculated based on sharpness of the image 408) but not whether it should be a plus or minus. By estimating potential distance values ($D_O$) for multiple images 408, we can determine which of the estimates match, and are likely accurate.

Figure 5:
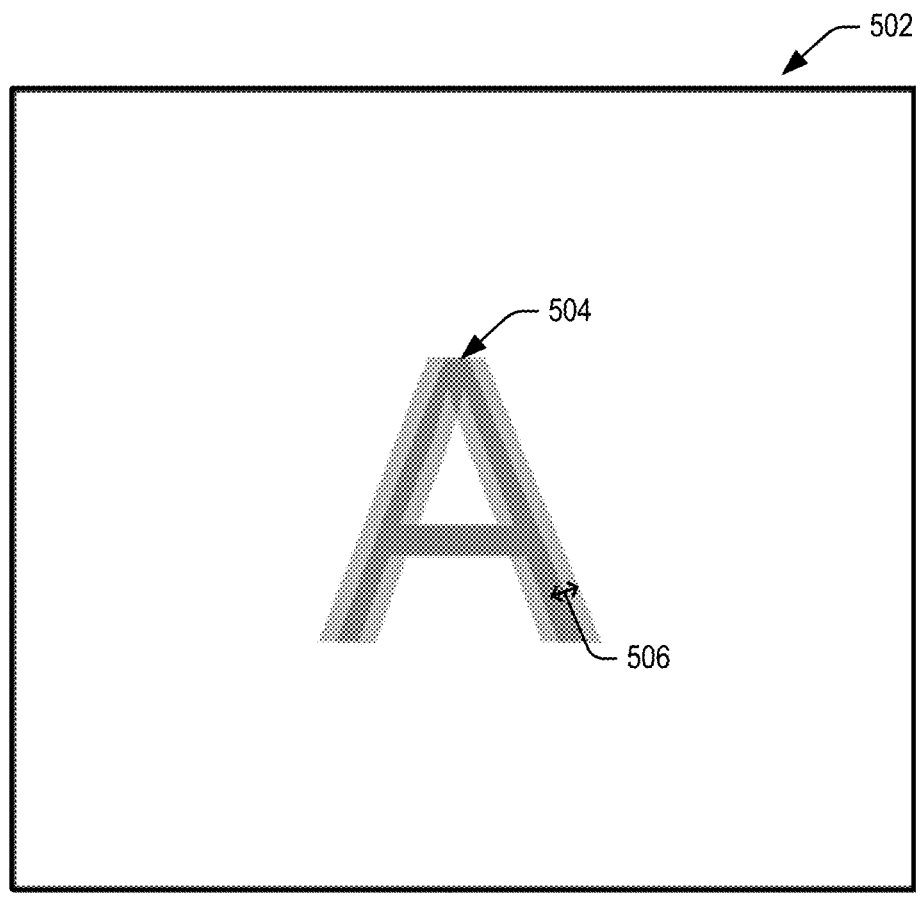
FIG. 5 illustrates an example approach for determining a sharpness for an object within an image in accordance with embodiments of the disclosure.

FIG. 5 illustrates an example approach for determining a sharpness for an object within an image in accordance with embodiments of the disclosure. FIG. 5 depicts an image 502 that may be collected with respect to a particular wavelength or range of wavelengths. Image 502 may be an example of one of separate images 408(A-C) depicted in FIG. 4. Image 502 may include an image of object 504.

A number of techniques may be used to calculate a sharpness of object 504 within image 502. Sharpness may represent a measure of how clearly an image's features (e.g., edges) are defined and may be calculated using the boundaries between zones of different tones or colors within an image. For example, sharpness may represent an amount to which an edge of an object blurs into its surroundings in an image. In some embodiments, more blur may be represented by a more gradual shift between tone or color boundaries.

One way to measure sharpness is to use the rise distance of the edge of the object 504, for example, the distance (in pixels, millimeters, or fraction of image height) for the pixel level to go from 10% to 90% of its final value. This is typically called the 10-90% rise distance. In this manner, a rise distance may be calculated as a quantitative value of sharpness, where a higher rise distance represents a lower sharpness value. For example, pixels along a line 506 leading from an outer edge of an object 504 to an interior of the object 504 may be sampled. The outer edge may be identified as the first pixel to include a tone or color associated with the object 504. Moving inward along 506, a color and/or tone value for each pixel may be measured until no further changes (or no further substantial changes) are detected. The distance between the point on line 506 at which no further changes are detected moving inward and the point on line 506 at which the outer edge is detected is the rise distance.

A second technique for measuring sharpness is to measure a variance, or delta, between an image of the object 504 and what the image of the object should look like. In this technique, one or more object recognition techniques may be used to identify the type of object depicted in the image 502. Once the type of object has been identified, an expected image may be identified (e.g., from an image database) associated with that image. For example, in the case that the image 502 is collected by a UAV, the image 502 may include image information related to a landmark (object 504). In this example, images of the landmark may be retrieved from an image database and compared to the image 502 collected by the 502. A sharpness of the image 502 may then be calculated as a variance between the image 502 and the retrieved expected image.

It should be noted that FIG. 5 provides only some example techniques for determining a sharpness for an object within an image. One skilled in the art would recognize that a number of equivalent techniques may be available. The description provided with respect to FIG. 5 is not meant to limit the use of techniques to those described.

Figure 6:
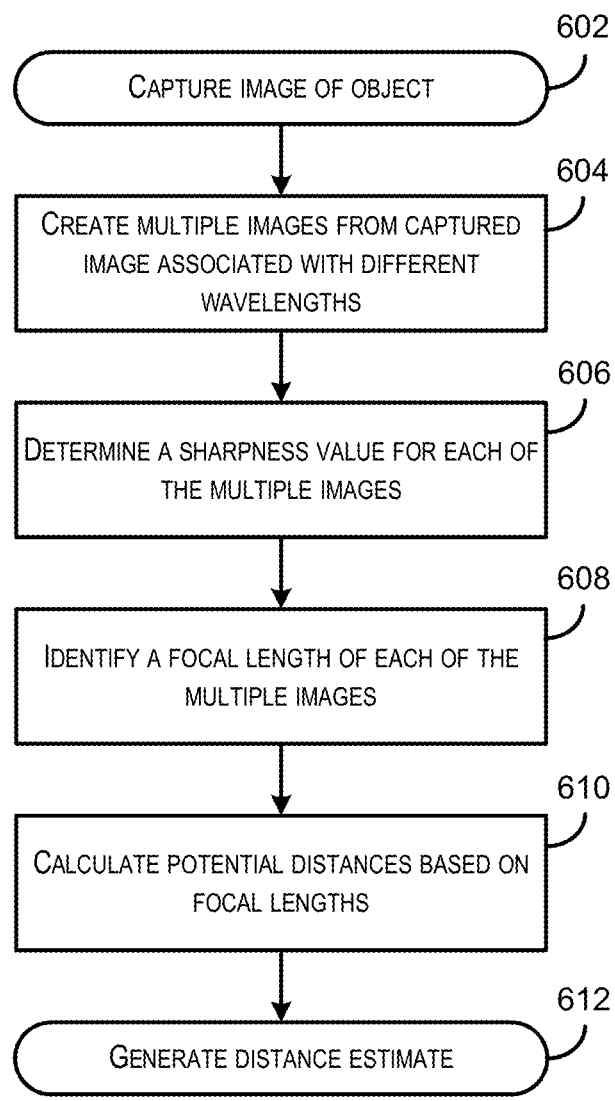
FIG. 6 illustrates a flow diagram depicting a process for determining a distance from an object using image information that includes an image of the object in accordance with at least some embodiments.

FIG. 6 illustrates a flow diagram depicting a process for determining a distance from an object using image information that includes an image of the object in accordance with at least some embodiments.

Some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In some embodiments, process 600 may begin at 602, when an image of an object is captured. In some embodiments, the image may be captured by an optical sensor (e.g., a camera device) installed on the electronic device and communicatively coupled to a processor of the electronic device. In some embodiments, the image may be a digital image stored in memory of the electronic device.

At 604, multiple images may be created from the captured image, each of which is associated with a different wavelength. In some embodiments, multiple images may be created by measuring color values associated with each pixel of the image. For example, each pixel of the image may be associated with a red value, a green value, and a blue value. Separate red, green, and blue images may be created by mapping these values to separate images. In some embodiments, a camera device may capture multiple images during an image collection and combine them into a single image file. For example, a digital camera may capture an image as separate images associated with different colors and then use a demosaicing process to combine them into a single full-color image. In this scenario, the separate images may be collected from the imaging device prior to the demosaicing process.

At 606, a sharpness value may be determined for each of the multiple images. Each sharpness value may represent a degree to which the image is blurred or a variance in the image. Some illustrative examples of techniques that may be used to determine quantitative sharpness values are described with respect to FIG. 5.

At 608, a focal length may be identified for each of the multiple images. In some embodiments, the lens (e.g., the material and curvature of the lens) may be selected to provide a specific focal length for particular wavelengths. A focal length for a particular wavelength may be calculated as a function of a refractive index of a material that the lens is made of for that wavelength and a curvature of the lens. In some embodiments, the focal lengths for each wavelength may be determined prior to implementing embodiments of the disclosure and these focal lengths may be stored in memory of the electronic device.

At 610, potential distances for the object may be calculated based on the sharpness value. In some embodiments, multiple distance estimates may be calculated for each image. For example, because the sharpness value may be used to determine how far the object is from the focal point with respect to a particular wavelength, but not which direction the object is in, two potential distances may be estimated such that $D_O=D_F\pm D_S$ (where $D_O$ is the distance to the object, $D_F$ is the distance to the focal point, and $D_S$ is the distance from the focal point to the object calculated based on the sharpness value). Because of this, potential distance estimates from multiple images may be compared to find a distance value that most closely matches at least one potential distance estimate from each of the images at 612. In some embodiments, the distance may be determined as the focal length of the image having the highest sharpness value. For example, the system may identify an image of the multiple images that has the highest sharpness value. Based on this assessment, the system may use the focal length of the sharpest image as an approximate distance of the object. In some embodiments, the system may only need to determine that a distance between itself and the object is above a threshold distance value. In this scenario, the system may only need to determine that the sharpness value indicates that the object is no closer than a specific distance.

The generated distance estimate may be used in a number of ways. For example, in some embodiments, an electronic device (e.g., a UAV or other unmanned vehicle) may use the distance information to calculate a current altitude. For example, the distance between the electronic device and an object on the ground may provide a rough estimate of the electronic device's altitude. An electronic device may also use the distance information in a collision avoidance system. For example, the electronic device may calculate a distance between itself and another object. Based on this distance, and a velocity at which the electronic device is traveling, the electronic device may determine that it will collide with the object. Given this information, the electronic device may be configured to adjust its route to avoid the object.

Figure 7:
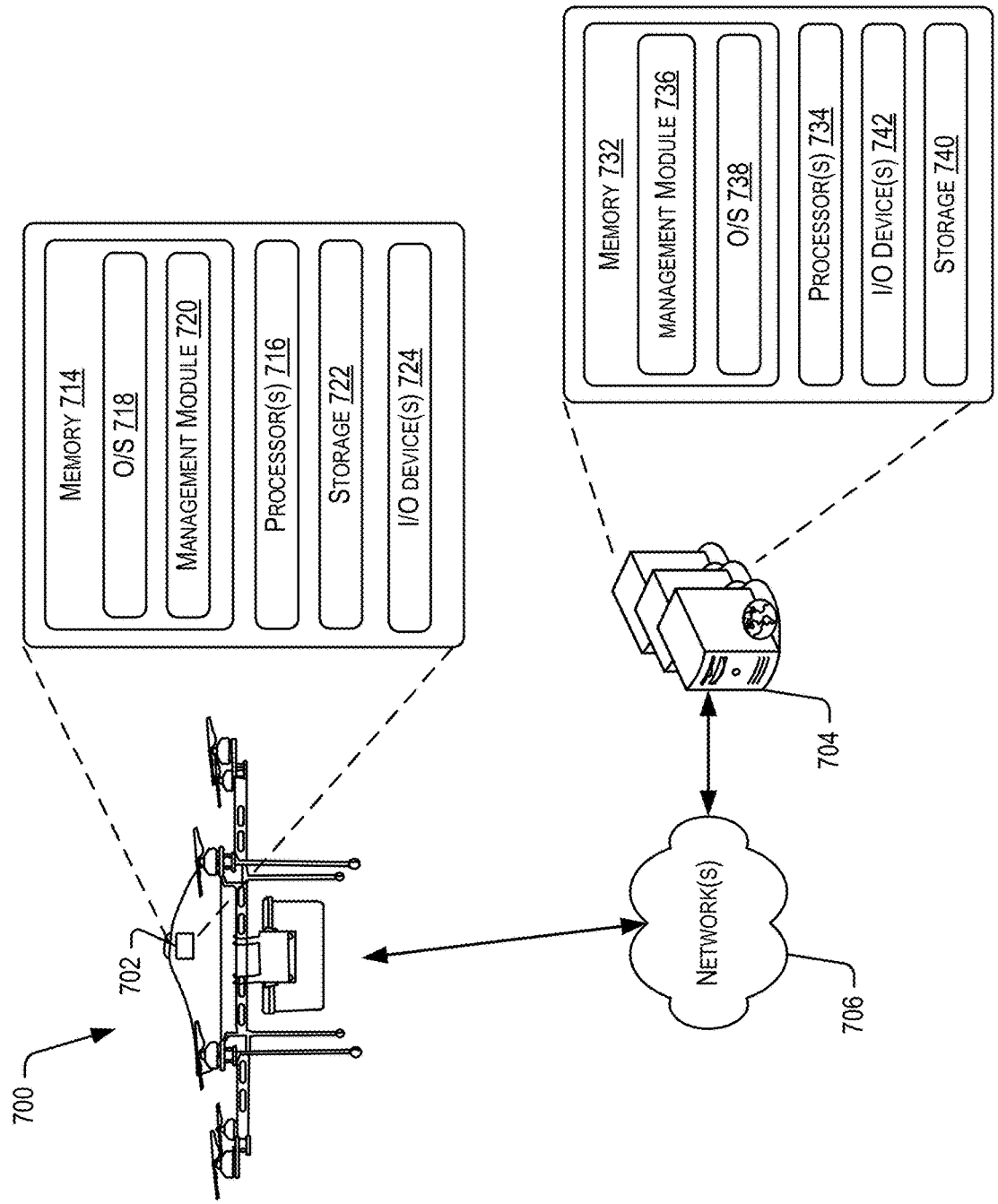
FIG. 7 depicts an example computing environment for implementing some of the above-described features within the context of determining a distance between a device and an object using imaging technology.

FIG. 7 depicts an example computing environment for implementing some of the above-described features within the context of determining a distance between a device and an object using imaging technology. The resulting distance information may be used by the device in a number of ways, such as reducing or increasing an altitude of a UAV. The architecture may include a UAV 700, a server 704, and a network 706. The UAV 700 may be an example of the UAV 200 depicted in FIG. 2. In some embodiments, the architecture may be implemented as part of an electronic marketplace offering items. For example, the server 704 may be in communication with the UAV 700 to facilitate a delivery of an item ordered from the electronic marketplace. This communication may occur over the network 706. The network 706 may include any one or a combination of many different types of networks, such as wireless networks, cable networks, cellular networks, radio networks, the Internet, and other private and/or public networks.

Turning now to the details of the server 704, the server 704 may include one or more service provider computers, such as servers and other suitable computing devices, configured to offer various data services to users. The server 704 may be configured to host a web site (or combination of web sites) accessible to customers. The web site may be accessible via a web browser and may enable a customer to place an order for an item. In some embodiments, the server 704 may provide remote processing services for a UAV 700.

In embodiments, the server 704 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the server 704 may include one or more servers, perhaps arranged in a cluster, or as individual servers not associated with one another.

In one illustrative configuration, the server 704 may include at least one memory 732 and one or more processing units (or processor(s)) 734. The processor(s) 734 may be implemented as appropriate in hardware, computer-executable instructions, software, firmware, or combinations thereof. Computer-executable instruction, software, or firmware implementations of the processor(s) 734 may include computer-executable or machine-executable instructions written in any suitable programming language to perform the various functions described. The memory 732 may include more than one memory and may be distributed throughout a plurality of a network of servers. The memory 732 may store program instructions (e.g., management module 736) that are loadable and executable on the processor(s) 734, as well as data generated during the execution of these programs. Depending on the configuration and type of memory, the memory 732 may be volatile (such as random access memory (RAM)) and/or non-volatile (such as read-only memory (ROM), flash memory, or other memory).

The server 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 732 may include multiple different types of memory, such as static random access memory (SRAM), dynamic random access memory (DRAM), or ROM.

Turning to the contents of the memory 732 in more detail, the memory 732 may include an operating system 738 and one or more application programs, modules or services for implementing the features disclosed herein including at least a management module 736. The management module 736, in some examples, may support, direct, manage, and/or control operations of some or all of the components of the UAV 700. For instance, the management module 736 may transmit data associated with a delivery of an item to the UAV 700. Such data may be used by the UAV 700, such as by a management module thereat, to deliver the item and modulate one or more sets of propellers of different sizes and/or treatments. Furthermore, the management module 736 may be used to select and deploy the UAV 700 on a delivery mission. As part of this selection, the management module 736 may also select a configuration of propellers of different sizes that may be used in the delivery of the item. The selection of the configuration of propellers of different sizes, including modulations that will occur during delivery between the sets of propellers of different sizes, may be based on a number of parameters as described herein. Further, the management module 736 may receive data (extrinsic, intrinsic, sound propagation characteristics, payload characteristics, etc.,) from the UAV 700 during the deployment and/or execution of the delivery mission. The management module 736 may process that data and provide, as applicable, further instructions to the UAV 700 to adjust the delivery of the item and/or adjust the modulation or simultaneous configuration of propellers of different sizes (e.g., to adjust an altitude of the UAV).

In some examples, the server 704 may also include additional storage 740, which may include removable storage and/or non-removable storage. The additional storage 740 may include, but is not limited to, magnetic storage, optical disks, and/or tape storage. The disk drives and their associated computer-readable media may provide non-volatile storage of computer-readable instructions, data structures, program modules, and other data for the computing devices.

The memory 732 and the additional storage 740, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors). The modules of the server 704 may include one or more components. The server 704 may also include I/O device(s) and/or ports 742, such as for enabling connection with a keyboard, a mouse, a pen, a voice input device, a touch input device, a display, speakers, a printer, or other I/O device.

Turning now to the details of the UAV 700, the UAV 700 may include some or all of the components of the UAV 200 described in connection with FIG. 2. In an illustrative embodiment, the UAV 700 may include a management component implemented, in part or in full, by computing system 702 similar to the computing system 204 of FIG. 2. The computing system 702 may include at least one memory 714 and one or more processing units (or processor(s)) 716. The processor(s) 716 may be implemented as appropriate in hardware, computer-executable instructions, software, firmware, or combinations thereof. Computer-executable instruction, software, or firmware implementations of the processor(s) 716 may include computer-executable or machine-executable instructions written in any suitable programming language to perform the various functions described. The memory 714 may include more than one memory and may be distributed throughout the computing system 702. The memory 714 may store program instructions (e.g., a management module 720) that are loadable and executable on the processor(s) 716, as well as data generated during the execution of these programs. Depending on the configuration and type of memory, the memory 714 may be volatile (such as random access memory (RAM)) and/or non-volatile (such as read-only memory (ROM), flash memory, or other memory).

The computing system 702 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM.

In some examples, the computing system 702 may also include additional storage 722, which may include removable storage and/or non-removable storage. The additional storage 722 may include, but is not limited to, magnetic storage, optical disks, and/or tape storage. The disk drives and their associated computer-readable media may provide non-volatile storage of computer-readable instructions, data structures, program modules, and other data for the computing devices.

The memory 714 and the additional storage 722, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computing system 702 may include one or more components.

Turning to the contents of the memory 714 in more detail, the memory 714 may include an operating system 718 and one or more application programs, modules or services for implementing the features disclosed herein including at least a management module 720. The management module 720 may be configured to provide flight operation management functions and/or to manage operations of different components to deliver an item at a delivery location. In an example, the management module 720 may operate autonomously or independently of the management module 736 of the server 704. In another example, the management module 720 may operate semi-autonomously or be fully controlled by the management module 736.

The computing system 702 may also include I/O device(s) 726 (e.g., interfaces, ports) such as for enabling connection with the server 704. The I/O device(s) 726 may also enable communication with the other components and systems of the UAV 700 (e.g., a propulsion system, and a payload holding system, a payload releasing system, a propeller modulating system).

Figure 8:
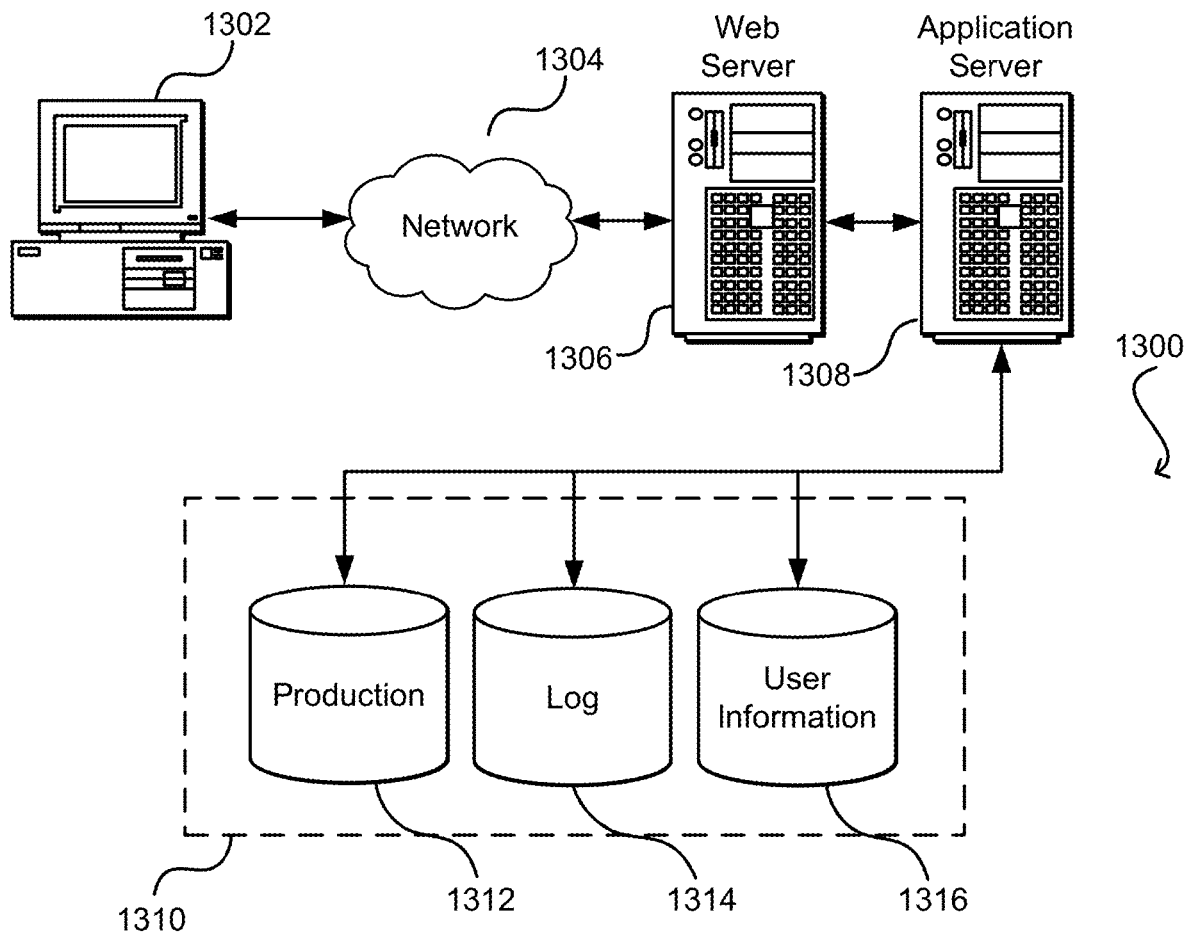
FIG. 8 illustrates an environment in which various embodiments may be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An electronic device comprising:
   a processor;
   a camera device including a lens at least partially uncorrected for chromatic aberration, the lens having a known curvature and refractive index; and
   a memory including instructions that, when executed by the processor, cause the electronic device to at least:
   capture an image of an object from the camera device;
   prior to performance of a demosaicing process, obtain multiple images,
   each of the multiple images associated with a different wavelength;

determine a sharpness value for each image of the multiple images, wherein the sharpness value for each image corresponds to a degree to which the respective image is blurred;

determine, based at least in part on the sharpness value for each image, a sharpest image; and determine, based at least in part on a focal length calculated from the known curvature and refractive index for the wavelength associated with the sharpest image, a distance of the object from the electronic device at least in part by: (1) calculating a distance of the object from a focal point associated with the sharpest image based on the sharpness value, and (2) either adding or subtracting that distance of the object from the focal point to or from the focal length, the adding or subtracting determined based at least in part on comparing distance estimates between the object and the electronic device for at least two of the multiple images, wherein the comparing distance estimates is performed based at least in part on a difference of sharpness values for at least two of the multiple images.

2. The electronic device of claim 1, wherein the electronic device is an unmanned aerial vehicle (UAV).

3. The electronic device of claim 1, wherein the instructions further cause the electronic device to at least adjust a course being traversed by the electronic device based on the distance of the object from the electronic device.

4. The electronic device of claim 3, wherein adjusting the course being traversed by the electronic device comprises increasing or decreasing an altitude associated with the electronic device.

5. The electronic device of claim 1, wherein determining the distance of the object from the electronic device comprises generating two potential distances of the object from the electronic device and selecting the distance of the object from the electronic device from the two potential distances of the object from the electronic device.

6. The electronic device of claim 5, wherein a first of the two potential distances of the object from the electronic device is generated by adding the calculated distance of the object from the focal point to the focal length, and wherein a second of the two potential distances of the object from the electronic device is generated by subtracting the calculated distance of the object from the focal point from the focal length.

7. A computer-implemented method, comprising:

capturing an image of an object via an imaging device, the imaging device comprising a lens at least partially uncorrected for chromatic aberration having a known curvature and refractive index;

creating multiple derivative images from the captured image, each of the multiple derivative images associated with a different wavelength;

determining a sharpness value for each derivative image of the multiple derivative images, wherein the sharpness value for each image corresponds to a degree to which the respective image is blurred;

determining a focal length for each derivative image of the multiple derivative images based on a wavelength associated with the derivative image based on the known curvature and refractive index of the lens of the imaging device; and determining, based at least in part on the focal length associated with each derivative image, a distance of the object from the imaging device at least in part by: (1) calculating a distance of the object from a focal point associated with a derivative image based on the sharpness value, and (2) either adding or subtracting the calculated distance of the object from the focal point to or from the focal length, the adding or subtracting determined based at least in part on comparing distance estimates between the object and the imaging device for at least two of the multiple derivative images, wherein the comparing distance estimates is performed based at least in part on a difference of sharpness values for at least two of the multiple derivative images.

8. The computer-implemented method of claim 7, wherein each of the multiple derivative images are associated with red, green, and blue wavelengths.

9. The computer-implemented method of claim 7, wherein at least one of the multiple derivative images are associated with an infrared or ultraviolet wavelength.

10. The computer-implemented method of claim 7, wherein the focal length for each derivative image of the multiple derivative images is determined prior to capturing the image of an object.

11. The computer-implemented method of claim 7, wherein creating multiple derivative images comprises collecting image information from the imaging device before a demosaicing process is performed on the image information.

12. The computer-implemented method of claim 7, wherein creating multiple derivative images comprises measuring separate color values associated with each pixel of the image and creating images associated with the separate color values.

13. The computer-implemented method of claim 7, wherein the distance of the object from the imaging device is determined as the focal length of the image having the highest sharpness value.

14. The computer-implemented method of claim 7, wherein a potential distance of the object from a focal point is calculated for at least two of the multiple derivative images and the resulting potential distances are compared to determine the distance of the object from the imaging device.

15. A non-transitory computer readable medium storing specific computer-executable instructions that, when executed by a processor, cause a computer system to at least:

receive an image of an object captured via one or more imaging devices, the one or more imaging devices comprising one or more lenses with known curvatures and refractive indices;

create multiple derivative images from the captured image, each of the multiple derivative images associated with a wavelength;

determine a sharpness value for each derivative image of the multiple derivative images, wherein the sharpness value for each image corresponds to a degree to which the respective image is blurred;

determine a focal length for each derivative image of the multiple derivative images based on a wavelength associated with the derivative image; and determine, based at least in part on the focal length associated with each derivative image, a distance of the object from the one or more imaging devices at least in part by: (1) calculating a distance of the object from a focal point associated with a derivative image based on the sharpness value, and (2) either adding or subtracting that calculated distance of the object from the focal point to or from the focal length, the adding or subtracting determined based at least in part on comparing distance estimates between the object and the imaging device for at least two of the multiple derivative images, wherein the comparing distance estimates is performed based at least in part on a difference of sharpness values for at least two of the multiple derivative images.

16. The non-transitory computer readable medium of claim 15, wherein the non-transitory computer readable medium comprises a server remote from an electronic device that includes the imaging device.

17. The non-transitory computer readable medium of claim 15, wherein the computer-executable instructions further cause the computer system to:
generate one or more instructions based on the determined distance of the object from the one or more imaging devices; and
provide the one or more instructions to an electronic device that includes the one or more imaging devices.

18. The non-transitory computer readable medium of claim 15, wherein the one or more lenses are configured to increase an effect resulting from a chromatic aberration for each derivative image.

19. The non-transitory computer readable medium of claim 15, wherein the multiple derivative images are created using multiple imaging devices of the one or more imaging devices, the multiple imaging devices comprising at least a first imaging device having a lens with a first focal length and a second imaging device having a lens with a second focal length, the first focal length being different from the second focal length.

20. The non-transitory computer readable medium of claim 15, wherein the sharpness value is determined as a rise distance.

* * * * *